Sept. 20, 1949.  G. F. HARDING  2,482,669
INSTRUMENT HAVING PHOTOELECTRIC CELL AND RECORDING
MEANS FOR MAKING EYE MEASUREMENTS
Filed March 27, 1946  3 Sheets-Sheet 1
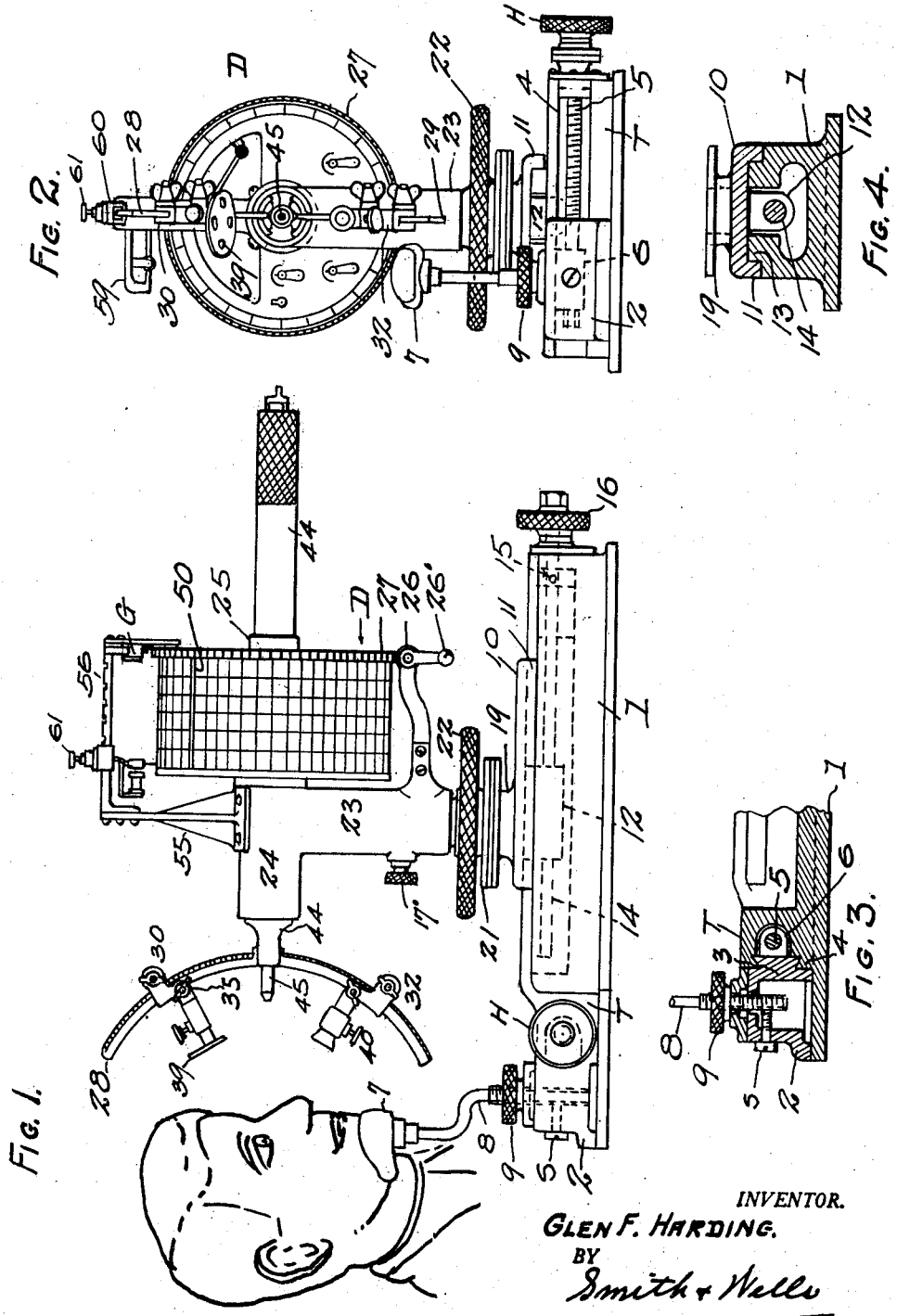
INVENTOR.
GLEN F. HARDING.
BY
Smith + Wells
attys.

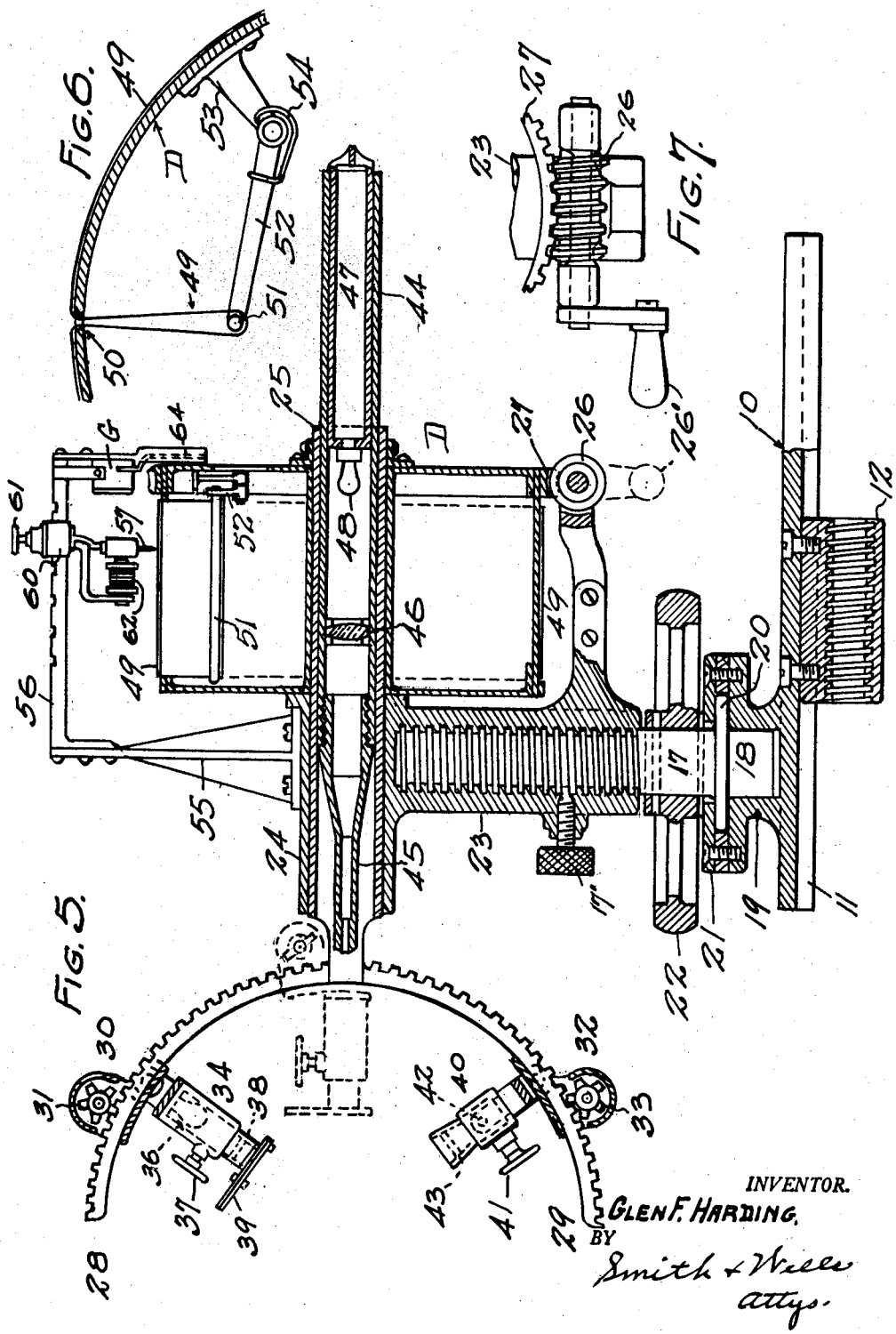

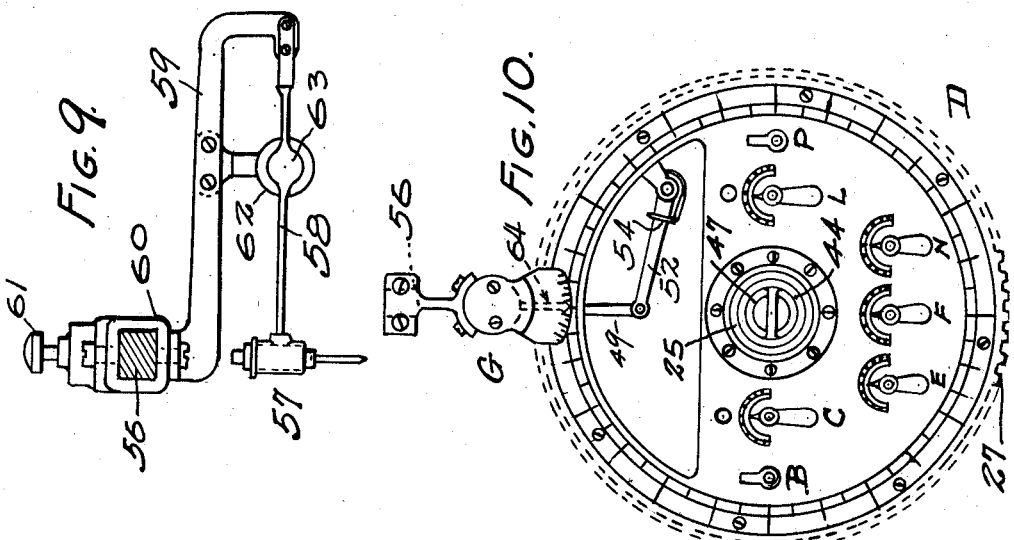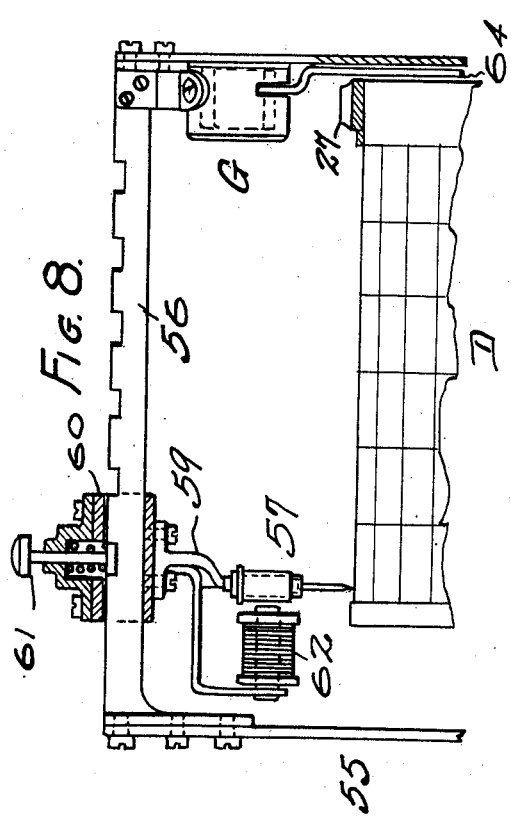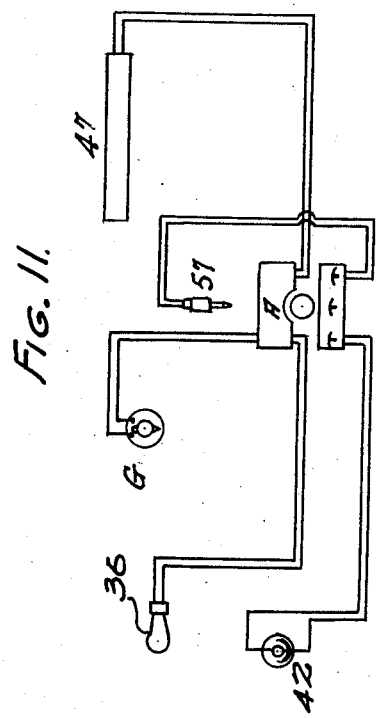

Patented Sept. 20, 1949

2,482,669

UNITED STATES PATENT OFFICE 2,482,669

INSTRUMENT HAVING PHOTOELECTRIC CELL AND RECORDING MEANS FOR MAKING EYE MEASUREMENTS

Glen F. Harding, Ogden, Utah

Application March 27, 1946, Serial No. 657,496

1 Claim. (Cl. 88—20)

The present invention relates generally to improvements in optometers, in the broad class of optics, and the improvements are directed particularly to an instrument for use by oculists and others skilled in the treatment of eyes and familiar with diseases pertaining to the eyesight or vision. The improved instrument provides for an accurate method and means for examining the eyes to ascertain, determine, and record light tolerance and refractive measurements of the human eye, and the resulting record is employed in diagnosing existing conditions. The record is displayed upon a chart, and the information and data thus secured may be utilized as an aid in accurately prescribing ophthalmic lenses of correct power for the patient.

The various elements, combinations of elements, and devices forming the instrument are compactly arranged and closely related, and the manually operated controls for the mechanical and electrical devices are arranged for ready access to the operator of the instrument. The instrument is comparatively simple in construction and operation, utilizing only a minimum number of parts that are readily assembled, adjusted, and operated for accuracy and reliability in the performance of their required functions.

In carrying out the invention for recording the measurements of the eye various means may be employed, one of which as herein disclosed is a stylus which is operated to record the measurements upon a chart-sheet, or a paper roll, but it will be understood that other reproducing means may be employed for this purpose.

In the construction and the instrument, and in the practice of ocular refractive procedure, a light source, and a photo-electric cell are arranged and related for joint rotatable adjustment around the line of vision or optical axis of the instrument as a center, through approximately three hundred and sixty degrees, in order that the light rays may enter and leave the eye at any desired or selected plane. The light source and its complementary electrode-optical device are also each independently adjustable in lateral planes, or in vertical planes, in relation to each other, and toward and away from the line of vision or optical axis of the instrument as a center, through arcs or segments of approximately ninety degrees.

Means are also provided, in the light source and in the electro-optical device, including adjustable iris and disks for variable apertures, lenses, light filters, diffractive gratings, and objectives, to change the intensity, form, and character of the produced light ray, i. e. wave lengths and degrees of parallelism of the light rays.

Through a controlling rheostat in the electrical operating system and circuits of the instrument, the intensity of the beam from the light source may be adjusted to measure the ability of the eye to resist light irritation (photophobia and strain) with filters added to produce certain specific wave lengths as desired, these measurements being employed to prescribe proper spectacles or lenses for the patient.

The output variations and results recorded, particularly in the case of astigmatism, are charted as an aid for reference, by means as a galvanometer in the electrical system of the instrument, and through the use of an electrically controlled stylus and chart sheet of paper, sensitized film, or other recording medium, to record amplified light variations corresponding to the output emanating from the light source and electro-optical device or photo-electric cell.

With the above ends in view, the invention consists in certain novel combinations and arrangements of parts as will hereinafter be more particularly pointed out and claimed. In the accompanying drawings one completed embodiment of the invention is illustrated wherein the parts are combined and arranged in accord with one mode I have thus far devised for the practical application of the principles of my invention; but it will be understood that various changes and modifications may be made in the structures of these exemplifying drawings without departing from the principles of the invention.

Figure 1 is a view in side elevation illustrating the instrument in operative position with relation to the eye of a patient; and Figure 2 is a front end elevation of the instrument as seen from the left in Fig. 1.

Figure 3 is a vertical, longitudinal, sectional view showing the relation of the laterally adjustable support for the patient to the cross-head of the supporting bed or table of the instrument.

Figure 4 is a vertical sectional detail view transversely of the longitudinal axis of the instrument depicting the relation of the longitudinally adjustable main frame of the instrument and the complementary bed or table.

Figure 5 is an enlarged vertical, sectional view disclosing the main frame, the rotatable parts of the instrument including the light source and electro-optical device, together with the longitudinally adjustable fixation target, and other details of construction.

Figure 6 is a sectional detail view, enlarged, showing the tightener or tension device for the endless chart sheet carried by the rotary drum.

Figure 7 is a detail view of the manual drive for rotating the recording drum. Figure 8 is an enlarged detail elevation partly in section disclosing the relation of the stylus and of the galvanometer to the rotary drum.

Figure 9 is a detail view transversely of the instrument showing the stylus. Figure 10 illustrates the rear or dial face of the rotary drum, with its annular degree-scale; which drum forms the amplifier and control box of the instrument.

Figure 11 is a diagram of the electrical wiring, or circuits, of the instrument.

As illustrated in the general assembly views, I employ a substantial, longitudinally extending bed or table 1 for the instrument, which has at its front end a transversely extending adjustable, slide frame 2 that is supported on a front extension or cross-head T of the bed. The slide frame 2 is mounted and guided in its movements on the bed by means of a dovetail tongue 3 on the frame, and a co-acting groove formed by the complementary ribs 4 integral with the cross-head T; and movement is imparted to the slide by turning a knurled head H and its adjusting screw 5; the latter journaled in the bed and threaded through a nut 6 rigid with the slide frame.

In Figs. 1 and 2 the slide frame may be set for examination of the right eye of the patient, and in Fig. 2 it will be understood that by turning the head H, the slide frame may be shifted to the right, past the longitudinal axis and optical center or line of vision of the instrument, for examination of the patient's left eye.

As best seen in Figs. 1 and 2, the slide frame carries a vertically adjustable chin support or seat 7 for the patient, which seat may be turned, and also adjusted to various heights through the use of an angular screw stem or post 8 that passes through the slide, and through a non-traveling nut 9 that is rotatably supported on the top of the slide frame. By turning the nut the chin-rest or support may be elevated or depressed in its adaptation for use by different patients, and by means of a set screw S the chin rest may be held in adjusted position.

The operating parts of the instrument are supported upon a longitudinally extending frame which is adjustable on the bed 1 toward and away from the patient's eye, as indicated in Fig. 1, through the instrumentality of a flat base plate 10 having side flanges 11, 11, and a traveling nut 12 rigid or integral with the base plate. The base plate is slidably supported on the grooved parallel ways 13, 13, that are separated by a central open slot in the hollow bed, as best seen in Fig. 4, and the frame is adjusted through the use of a screw bar 14 journaled against longitudinal movement, as at 15, in the rear end wall of the bed, and manually turned by the use of a knurled head 16 exterior of the rear end of the bed.

Upon the longitudinally adjustable base plate 10, the operating parts of the instrument, as a unit, are mounted, and the unit is vertically adjustable for adaptation to different characteristics of the patient. The unit is supported by means of a threaded and rotatable upright post or screw bar 17 having a flanged head 18 mounted to rotate in a journal bearing 19 on the upper face of the base plate 10. The head 18 and the annular flange 20 of the screw bar, as best seen in Fig. 5 are retained in their bearings by means of a retaining plate 21, and a hand wheel 22 is rigidly mounted near the lower end of the screw bar for use in turning the screw bar. A set screw 17' may be utilized for securing the unit in adjusted position.

The support for the operating parts of the unit include an upright tubular internally threaded bushing 23, and an integral, horizontally disposed sleeve 24, the former being threaded upon the rotatable screw bar; and the latter affording a bearing for a rotatable, tubular, shaft 25 journaled in the sleeve. A cylindrical drum D is rigidly mounted upon the rear end of the shaft, to turn therewith, and the drum and shaft may be rotated or revolved through the instrumentality of a manually operated worm gear 26 journaled in a suitable bracket of the bushing 23, and meshing with a complementary gear ring 27 mounted upon the exterior of the cylindrical drum. By means of a hand crank 26' the drum and shaft may be revolved about the central axis or optical axis of the instrument in adapting or adjusting the latter during tests or examinations of the eyes.

The front end of the tubular shaft 25 projects through and beyond the front end of the horizontal bearing sleeve 24, and at its front end the shaft carries two diametrically opposed quadrants or arcuate rack arms 28 and 29, forming a semi-circular segment of one hundred and eighty degrees extending transversely of the longitudinal axis of the instrument, and it will be understood that this longitudinal axis of the instrument is also the optical axis forming one plane of the reflex system which includes other angularly disposed planes.

As indicated in Fig. 1 the chin rest is vertically adjusted in order that the patient's eye may be alined with the optical axis or line of vision, and the chin rest supports the patient's head in position for examination of the eye in addition to centering the eye with relation to the segmental rack 28—29.

Each of the rack arms 28, 29, is equipped with an adjustable, duplicate, traversing carrier that may manually be adjusted from the central dotted position in Fig. 5, outwardly toward the ends of the arcuate arms. Arm 28 is provided with a light source or illuminating device for the eye, and arm 29 has a photo electric device or cell, each mounted on a carrier that is adjustable on its supporting rack arm.

The light carrier 30 on arm 28 is a casing in which a pinion 31 is journaled for co-action with the teeth of the rack arm, and an exterior manually turned knob is employed to turn the pinion and thus adjust the carrier on its arm.

The carrier 32 for the photoelectric cell is also provided with a pinion 33 and an exterior knob for adjusting this device on its rack arm about the eye as a center.

The light housing 34, for precise adjustment, is supported by a pivoted bracket 35 on its carrier 30, and it is clamped in adjusted position by means of a clamp nut. The lamp 36, shown by dotted lines, is mounted within the sectional telescopic housing 34, and these sections are fixed in adjusted position by means of a set screw 37. A condensing lens is indicated at 38 in dotted lines, which lens is of suitable capacity to conduct most of the wave lengths satisfactorily, and the telescopic construction of the light housing permits and provides for its adjustment.

A ray of light from the lamp 36 is directed through a light aperture provided in the adjustable shutter 39, which is preferably of the type employed in photographic cameras, and receiving light from one of a series of apertures.

The casing 40 of the photo-electric cell is also attached to its carrier 32 by a pivot bracket and secured by a clamp nut, and its telescopic or sectional parts are clamped together in longitudinal adjustment by means of a set screw 41. The photo-electric cell 42, shown in dotted lines, is also enclosed within its telescopic housing, and the lens 43 is mounted within a conical hood of the housing.

Within, and forming part of the reflex system is mounted an adjustable fixation target 44—45, including a light tube 47, mounted to slide longitudinally within the tubular shaft 25 along the optical axis or line of vision of the instrument, and the target is centered in the axis of rotation of the adjustable light source and the photo-electric cell, for adjustment toward and away from the eye of the patient.

This fixation target and its accessories may be longitudinally projected to approach the eye under examination and aid the patient in concentration of the pupil of the eye; and then the fixation target may be retracted to a proper distance as will enable the patient to maintain fixation and concentration for the examination and measurement of the eye.

The non-rotatable, axially alined, longitudinally adjustable focusing instrument or fixation target includes a cylindrical barrel 44 open at the rear end and provided at its front end with an apertured, conical head 45, to the rear of which is transversely mounted an interior lens 46. Within the barrel is also mounted a removable light tube 47, at the front end of which is carried an illuminating lamp 48. The light tube 47, which contains the required electrical conductors is prefocused and fixed in adjusted position within the barrel along the optical axis of the instrument, and in proper relation to the lens 46, and in proper relation to the front apertured conical head 45 of the barrel.

For recording the examinations and tests of the eye a suitable recording sheet or chart is mounted on the exterior periphery of the cylindrical drum D, and as here shown this chart may be an endless paper band 49 having thereon two series of annular and horizontal lines forming six columns or annular series of rectangular spaces. As indicated in Figs. 1, 5, and 6, the band 49 or roll encircles the drum D, and a portion of the band 49 is passed through a longitudinally extending slot 50 in the annular wall of the drum D, and into the interior of the drum. Within the drum the endless band 49 is engaged by a tightening or stretching device which automatically lays and retains the chart smoothly in proper position for use within a range of three hundred and sixty degrees.

As shown this tightener includes a horizontal stretch bar 51 about which the chart sheet is looped, and the bar 51 is carried at the free end of a tension lever 52 pivoted in a bracket 53 mounted in suitable manner within the interior of the drum D. A compensating spring 54, having a fixed support at one end, is looped at its other end over the lever 52, to urge the lever and bar 51 toward the center of the drum D, and thus stretch and hold the band 49 tightly on the exterior of the drum D.

For use with the rotating chart and inscribing the data thereon, an electro-magnetically operated recording device, receiving impulses from the electro-optical device or photo-electric cell, is mounted over the drum D, and adjustable longitudinally of the drum D, in positions for co-operation therewith.

For this purpose a suitable bracket 55 is mounted upon the horizontal bearing sleeve 24, and a horizontal rack bar 56 is supported from the bracket 55 to extend longitudinally and at a predetermined height above the drum D. As here shown the recording device includes a stylus 57, having an appropriate fountain-feed for the writing fluid or ink, which is mounted by a spring-arm 58 on an angular bracket arm 59 that is fixed to a tubular slide or collar 60. The stylus 57 is thus manually adjustable on the rack bar 56 for alinement in various positions with the annular degree marks or series of spaces on the chart sheet or endless band 49 of the drum D, and by means of a spring detent 61 mounted on the slide 60 for co-action with the rack bar 56, the slide and stylus 57 may be retained in adjusted position for use.

Impulses or pulsations from the photo-electric cell 42 are received through proper electrical connections by an electro-magnet 62 mounted on the angular arm 59 of the stylus 57, and the electro-magnet co-acts with an armature 63 mounted on the spring arm for vibrating the stylus 57.

For measuring and determining the strength and direction of the electrical impulses conveyed to the electro-magnet 62, a galvanometer G is supported from the rear end of the rack bar 56, and the needle or pointer 64, of the galvanometer G, enclosed within a transparent hood 65, co-operates with the annular three hundred and sixty degree scale on the rear dial face of the drum D. The galvanometer hood 65 is provided with a small vernier scale for measuring a fractional part of the divisions on the larger annular primary scale on the drum D, as indicated by the position of the rotary drum with relation to the fixed vernier scale.

For convenience of illustration, the electric wires or conductors of the various circuits are omitted from the drawings, but it will be understood that the instrument is wired for efficiency and convenience in operation according to the diagram of Fig. 11, where an ammeter A for measuring the strength of the electric currents supplied to the instrument is included for the circuits. The controls for the electric circuits are indicated in Fig. 10 as mounted upon the exterior face of the rear head of the drum D, which contains electrical appliances and devices within its interior, and an opening in the head is provided for access to the interior of the drum D, when desired.

Fig. 10 indicates a master switch B for controlling the power intake, and switch P controls the electric supply to the photo-electric cell 42 and amplifier circuit; switch L controls the lamp circuit of the focusing light-tube 47 and rheostat; and switch C controls the circuit for the illuminating lamp 36 of the segmental arm 28; while the three switches E, F, and N, respectively, control the sensitivity of the photo-electric cell 42, the zero setting for the galvanometer G, and the electro-magnetic control of the stylus 57.

The current from the photo-electric cell 42 in the form of impulses is amplified within the drum to build up the comparatively weak impulses from the cell to the required strength or level for actuating the electro-magnet and operating the stylus, which records the data on the paper chart or endless paper band.

It will be understood that the vernier scale of the galvanometer and the degree scale of the rear dial of the drum may be employed in securing data jointly with the stylus; and, when desired these readings or recordings may be made independently.

In preparing the instrument for an operation, it will be evident that the adjustable supporting parts or frames may with convenience be manually moved to desired positions for efficient use; and the operating unit of the instrument may be initially alined with the optical axis or line of vision by adjusting the barrel 44 toward the eye until the projected light from the small aperture in the conical head is focused on the exact area where the eye pupil is centered for accurate measurements, after which the barrel may be moved to position as a fixation target.

The illuminating lamp and the photo-electric cell mounted on the arcuate arms may with facility be adjusted to desired positions; and the stylus is initially set or adjusted on its rack bar for making the proper recordings. These multiple light sources, including the lamp 36 and the photo-electric cell 42 are adjustable to various angles or tangents in relation to the line of vision and optical axis of the instrument, and either, or both of the devices may be employed, as desired.

Having thus fully described my invention, what I claim as new and desire to secure by Letters Patent is:

An instrument for making eye measurements by directing a light beam into the eye and measuring the reflected rays from the eye comprising, in combination, a support, a shaft journalled in the support, a semi-circular bar secured to one end of the shaft and providing two supporting arms curving away from the shaft in opposite directions about a center point axially spaced from the shaft beyond the said end, a light source carried by one of said arms and movable lengthwise thereof to different angular positions relative to the axis of said shaft, a photo-electric cell carried by the other arm and movable lengthwise thereof to different angular positions relative to the axis of said shaft, whereby light from said source may be reflected by an eye positioned at said center point to the photo-electric cell, a drum secured on said shaft, a chart sheet on said drum, a recording stylus, means fixed relative to said support and supporting the stylus in operative relation to the chart sheet, electrical means responsive to current changes in said photo-electric cell for actuating the stylus, and means to rotate the drum and the shaft together whereby to record the current changes in said photo-electric cell as the light source and the cell are rotated about an eye located at said center point.

GLEN F. HARDING.

REFERENCES CITED

The following references are of record in the file of this patent:

UNITED STATES PATENTS

| Number | Name | Date |
|---|---|---|
| 681,494 | Chambers | Aug. 27, 1901 |
| 1,633,658 | Brown | June 28, 1927 |
| 1,686,962 | Deninson | Oct. 9, 1928 |
| 1,721,208 | Currier et al. | July 16, 1929 |
| 1,833,482 | Brierton | Nov. 24, 1931 |
| 1,869,700 | Mandaville | Aug. 2, 1932 |
| 2,009,158 | Berens | July 23, 1935 |
| 2,192,385 | Reason | Mar. 5, 1940 |
| 2,235,319 | Jobe | Mar. 18, 1941 |
| 2,288,430 | Bauman | June 30, 1942 |
| 2,304,814 | Glasser | Dec. 15, 1942 |
| 2,367,855 | Ettinger | Jan. 23, 1945 |
| 2,374,854 | Feinbloom | May 1, 1945 |